United States Patent [19]

Baker et al.

[11] Patent Number: 4,856,600
[45] Date of Patent: * Aug. 15, 1989

[54] TECHNIQUE FOR PROVIDING AN UNDERGROUND TUNNEL UTILIZING A POWERED BORING DEVICE

[75] Inventors: Glen Baker, Kent; Albert W. Chau, Redmond; James A. Fikse, Kirkland; John E. Mercer, Kent, all of Wash.

[73] Assignee: FlowMole Corporation, Kent, Wash.

[*] Notice: The portion of the term of this patent subsequent to Dec. 22, 2004 has been disclaimed.

[21] Appl. No.: 260,937

[22] Filed: Oct. 21, 1988

Related U.S. Application Data

[63] Continuation of Ser. No. 866,240, May 22, 1986, Pat. No. 4,821,815.

[51] Int. Cl.$^4$ .......................... E21B 7/08; E21B 44/00
[52] U.S. Cl. ......................................... 175/26; 175/45; 175/61; 175/62; 175/67; 175/162
[58] Field of Search ...................... 175/26, 40, 45, 61, 175/62, 67, 73, 162; 405/248

[56] References Cited

U.S. PATENT DOCUMENTS

| | | | |
|---|---|---|---|
| 3,465,834 | 9/1969 | Southworth, Jr. .................. | 175/73 |
| 3,712,391 | 1/1973 | Coyne .................................. | 175/26 |
| 3,853,185 | 12/1974 | Dahl et al. ........................... | 175/45 |
| 3,870,111 | 3/1975 | Tuomela et al. ..................... | 175/11 |
| 3,891,038 | 6/1975 | Delestrade et al. .................. | 175/45 |
| 4,625,815 | 12/1986 | Spies .................................... | 175/73 |
| 4,640,353 | 2/1987 | Schuh ................................... | 175/61 |
| 4,674,579 | 6/1987 | Geller et al. ......................... | 175/45 |
| 4,714,118 | 12/1987 | Baker et al. ......................... | 175/26 |

FOREIGN PATENT DOCUMENTS

| | | | |
|---|---|---|---|
| 3012482 | 10/1981 | Fed. Rep. of Germany ........ | 175/67 |
| 2126267 | 3/1984 | United Kingdom .................. | 175/67 |

*Primary Examiner*—Jerome W. Massie, IV
*Assistant Examiner*—Terry Lee Melius
*Attorney, Agent, or Firm*—Flehr, Hohbach, Test, Albritton & Herbert

[57] ABSTRACT

A technique for providing a continuous underground tunnel between first and second spaced-apart points and for installing new cable, pipe or conduit is disclosed herein. This technique utilizes a boring device including means for boring through soil and a thrust conduit which pushes the boring device through the soil from a first starting point to a second end point as the device bores through the soil, whereby to form a tunnel between the two points. Thereafter, the cable to be installed within the tunnel is attached to the front end of the boring device and the latter is pulled back through the tunnel to its starting point by means of the thrust cable, thereby automatically pulling the new cable in place.

7 Claims, 5 Drawing Sheets

U.S. Patent    Aug. 15, 1989    Sheet 1 of 5    4,856,600
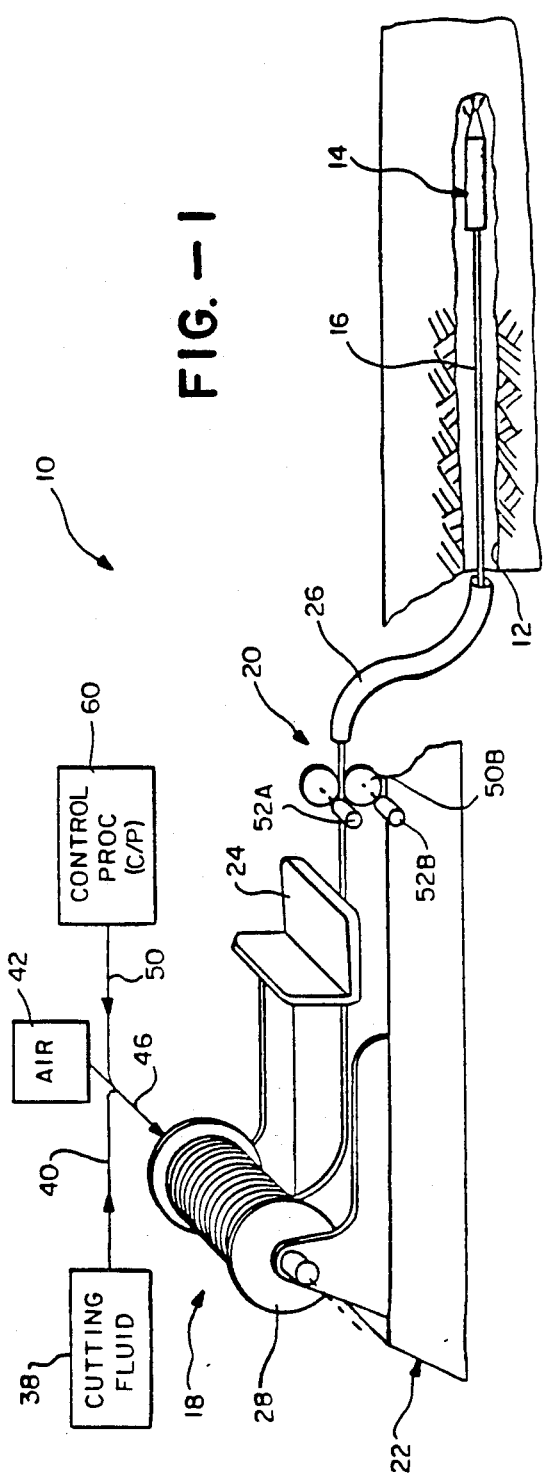
FIG.—1
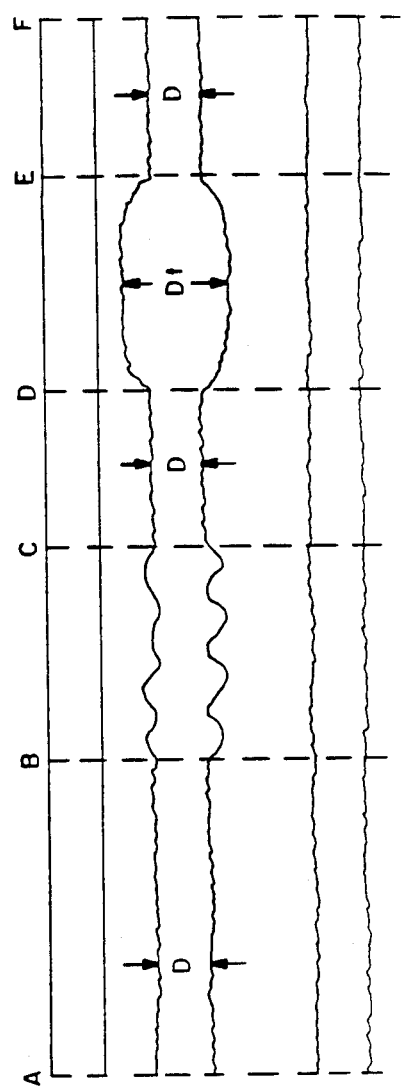
FIG.—1B
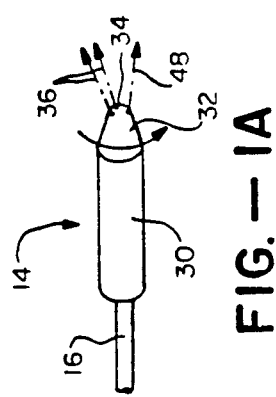
FIG.—1A

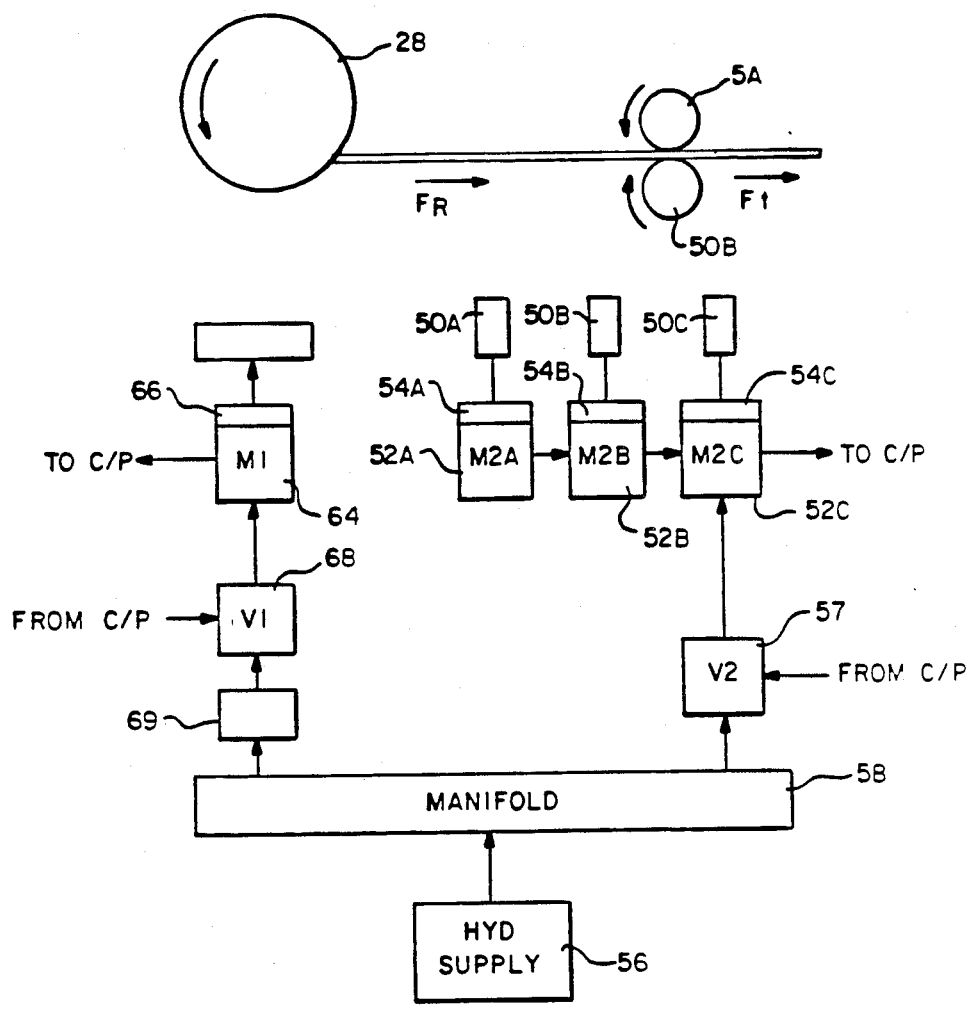
FIG. — 3
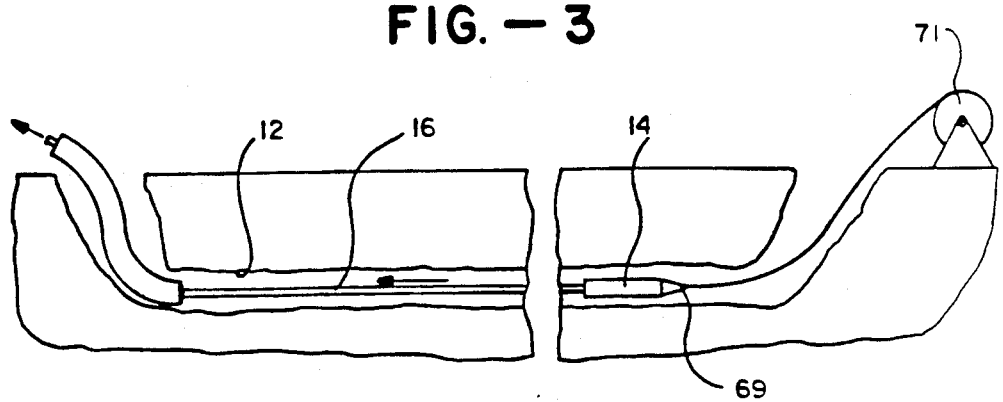
FIG. — 4

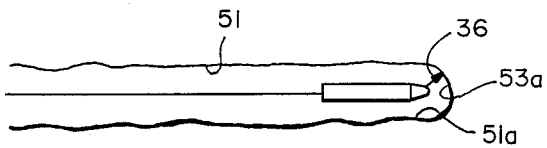
FIG.—11A
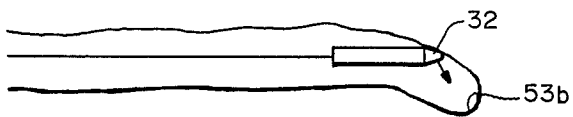
FIG.—11B
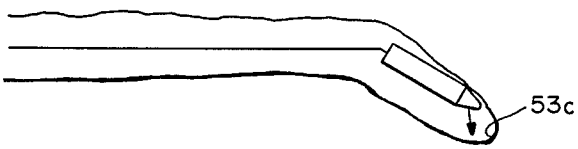
FIG.—11C
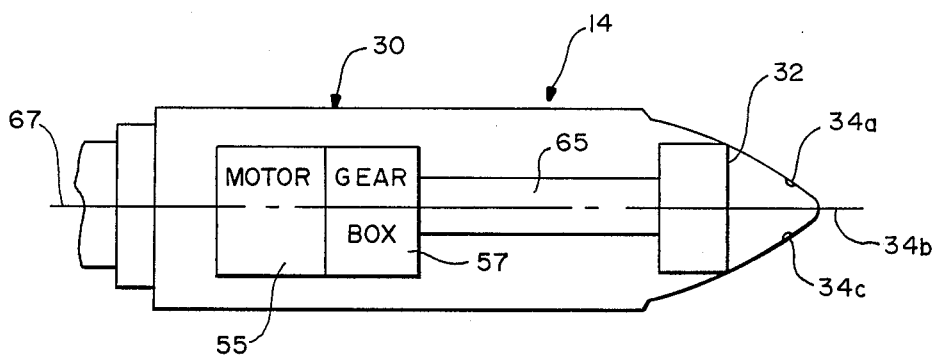
FIG.—12
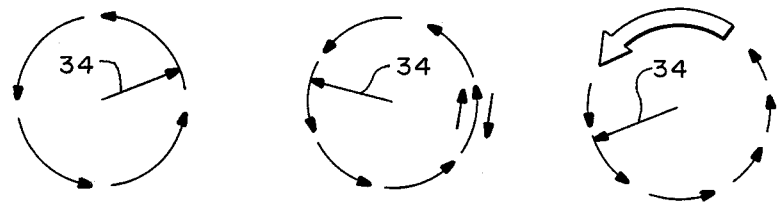
FIG.—13A  FIG.—13B  FIG.—13C

TECHNIQUE FOR PROVIDING AN UNDERGROUND TUNNEL UTILIZING A POWERED BORING DEVICE

This is a continuation of application Ser. No. 866,240, filed May 22, 1986, now U.S. Pat No. 4,821,815.

The present invention relates generally to underground boring techniques and different methods for installing underground cable and more particularly to an underground boring technique for providing a tunnel and for installing new cable within the tunnel over relatively long distances without having to dig trenches and without having to rely on existing underground cable to provide the tunnel.

Obviously one typical way to install inground cable, conduit or pipe such as power cable, telephone lines, gas lines, water lines or the like, is to dig a continuous trench. While this may be relatively easy to do in rural areas it is more difficult and sometimes impossible to provide a continuous trench in an urban area due to above ground obstructions. Therefore, in those cases where new utilities are being installed, it is typical to provide a combination of open trenches and boring techniques consisting of short runs where possible, for example, under driveways and streets. In the case where an obstruction is too large to bore under, either an open trench has to be provided around the obstruction or the obstruction had to be removed, assuming it is necessary to provide the underground utility. More recently, in cases where it has been necessary to replace existing underground cable, an underground cable following apparatus has been utilized in a manner described in, for example, U.S. Pat. Nos. 4,385,667, 4,493,379 and 4,534,425. As seen in these patents, the apparatus engages and moves along the length of the existing underground cable. As it does so, it bores a tunnel the length of and around the existing cable which is thereafter removed and replaced with a new cable. While this technique is quite effective, it does require the presence of an existing cable.

In view of the foregoing, it is an object of the present invention to provide an uncomplicated, reliable and economical technique for providing a continuous underground tunnel over a relatively long distance, for example 200 to 500 feet, for receiving cables such as utility cables, telephone lines and the like.

A more particular object of the present invention it to provide the last-mentioned tunnel by means of a boring device which is literally pushed through the ground from its back end as the device bores through the soil.

Another particular object of the present invention is to provide an underground tunnel having a substantially uniform diameter along its entire length utilizing the last-mentioned boring device, regardless of the degree of compactness of the soil through which the boring device is being pushed.

Still another particular object of the present invention is to push the last-mentioned boring device through the soil by means of a thrust conduit which extends in a continuous, uninterrupted manner over its entire length and yet a conduit which is sufficiently rigid so as to be able to push the boring device forward through the soil while sufficiently flexible to follow the boring device along the non-linear course, if necessary.

Still another particular object of the present invention is to unwind the last-mentioned thrust conduit from and wind it on to a reel in a controlled manner as the boring device is moved through the ground, without the thrust conduit uncontrollably unwinding from the reel even though the cable is sufficiently rigid to push the boring device through the soil.

A further object of the present invention is to provide an uncomplicated and yet reliable technique for installing long lengths of cable, pipe or conduit underground without having to dig any external trenches.

As will be described in more detail hereinafter, the present invention is directed to a technique for providing a continuous underground tunnel between first and second spaced-apart points by means of (1) a boring device including means for boring through soil and (2) a drive assembly including a thrust conduit for pushing the boring device in a forward direction as it bores through the soil, in order to provide the desired tunnel. In accordance with one feature of the present invention, the thrust conduit extends in a continuous, uninterrupted manner along its entire length and preferably contains various control and power lines connecting the boring device to cooperating components above ground. The thrust conduit must be sufficiently rigid to push the boring device forward through the soil and yet it must be sufficiently flexible to follow the boring device along a non-linear path, if necessary.

In accordance with another feature of the present invention, the thrust conduit is initially unwound from a support reel by means of a thrust assembly which acts upon the conduit to push the boring device through the soil. The thrust assembly and support reel are spaced-apart from one another and operated in a way which insures that a section of the thrust conduit between a thrust assembly and support reel is at all times held taut so as to prevent the cable from unwinding from the reel in an uncontrolled manner, as a watch spring might do.

In accordance with still another feature of the present invention, the boring device is provided with one or more fluid cutting jets and the system is designed to provide a tunnel of uniform diameter regardless of the compactness of the soil through which the boring device must travel to produce the tunnel. This is accomplished by providing a motorized thrust assembly which pushes the thrust conduit forward with constant torque force regardless of the soil conditions.

In accordance with a further feature of the present invention, the boring device recited above not only serves to provide a continuous underground tunnel between two points but also serves to install a new cable, conduit or pipe within the tunnel. This is carried out by connecting one end of the new utility to be installed to the front end of the boring device after it has provided the tunnel and reached its end point. Thereafter, the thrust conduit is used to pull the boring device back through the tunnel to its starting point and, as it does so, it pulls the new utility with it.

The foregoing features and other features of the present invention will be described in more detail hereinafter in conjunction with the drawings wherein:

FIG. 1 is a diagrammatic illustration, in perspective view, of an overall apparatus designed in accordance with the present invention for providing a continuous underground tunnel between first and second spaced-apart points;

FIG. 1a is a perspective view of a boring device forming part of the overall apparatus of FIG. 1;

Figure 5:
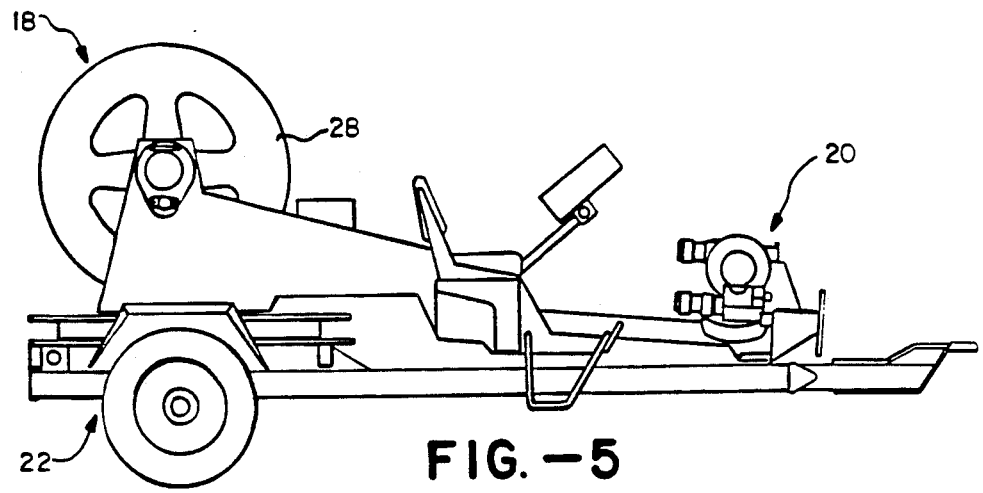
Figure 6:
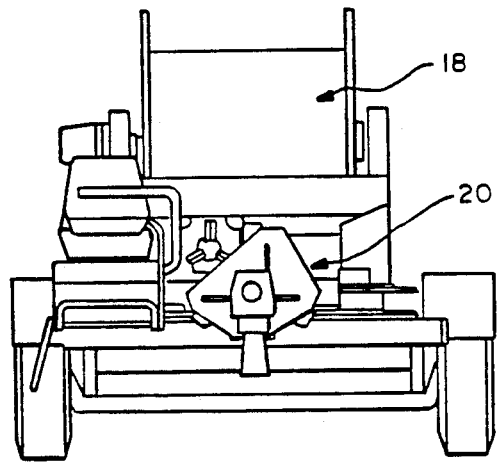

FIG. 1b diagrammatically illustrates how the apparatus of FIG. 1 functions in soil which varies in hardness, FIG. 2 is a diagrammatic illustration, in side elevational view, of a specific aspect of the apparatus of FIG. 1;

FIG. 3 illustrates by means of a block diagram a particular operational feature of the apparatus of FIG. 1;

FIG. 4 diagrammatically illustrates how the apparatus of FIG. 1 is used to install new underground cable;

FIG. 5 is a side elevational view of a trailer assembly which is constructed in accordance with an actual working embodiment and which serves to support a number of the components forming part of the overall apparatus diagrammatically illustrated in FIG. 1;

FIG. 6 is an elevational view of the back end of the trailer of FIG. 5

Figure 7:
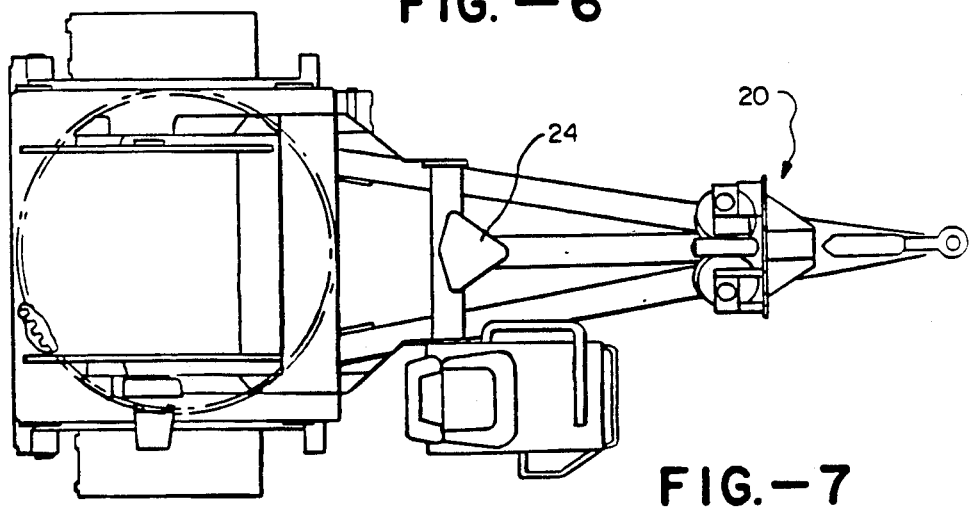
Figure 8:
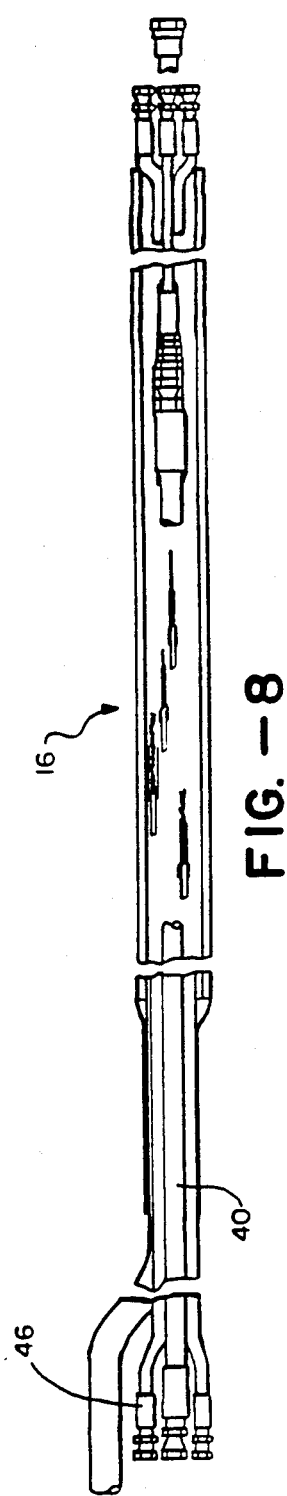
Figure 10:
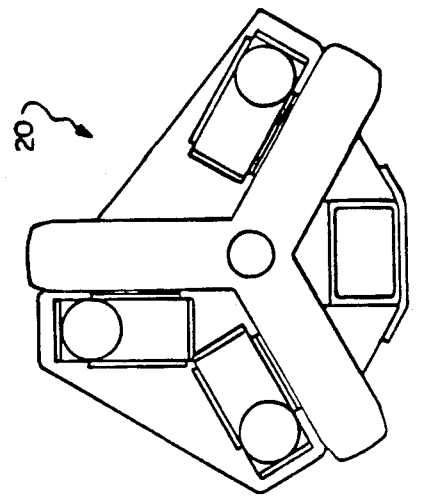
Figure 9:
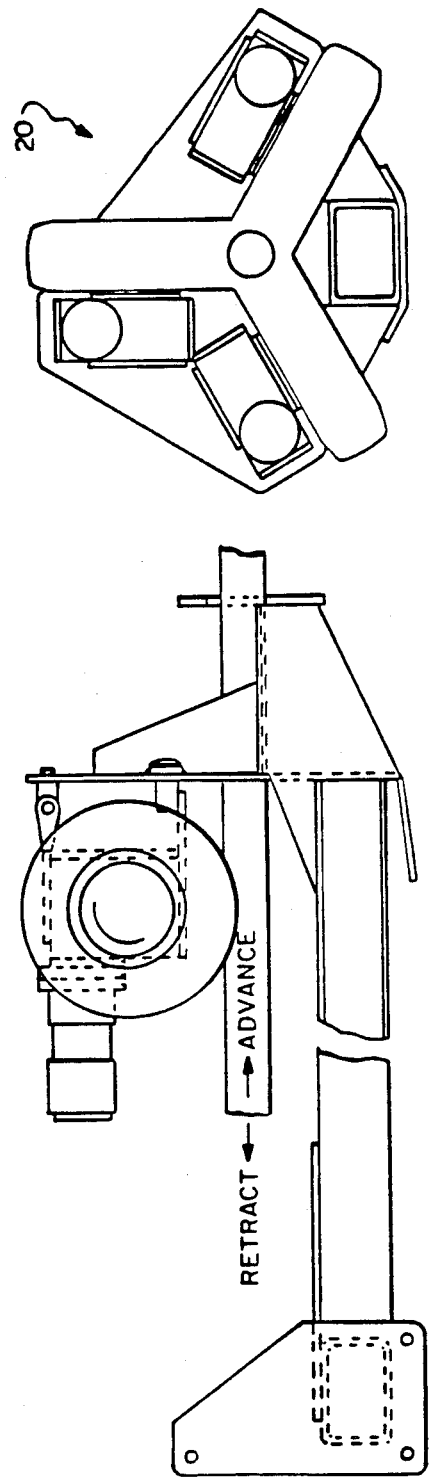

FIG. 7 is a plan view looking down on the trailer of FIG. 5;

FIG. 8 is a longitudinal sectional view of an actual working embodiment of a thrust conduit which forms part of the overall apparatus diagrammatically illustrated in FIG. 1;

FIG. 9 is a side elevational view illustrating an actual working embodiment of a thrust assembly which comprises part of the overall apparatus diagrammatically illustrated in FIG. 1;

FIG. 10 is a front elevational view of the thrust assembly illustrated in FIG. 9;

FIGS. 11A, 11B and 11C diagrammatically illustrate how the boring device of FIG. 1A makes turns in the soil as it bores through the latter;

FIG. 12 is an enlarged diagrammatic illustration of certain features of the boring device illustrated in FIG. 1A; and FIGS. 13A, 13B and 13C diagrammatically illustrate how the device of FIG. 12 is steered in accordance with the present invention.

Turning now to the drawings, wherein like components are designated by like reference numerals throughout the various figures, attention is first directed to FIG. 1. This figure diagrammatically illustrates an apparatus designed in accordance with the present invention to provide a continuous underground tunnel between a first entry point and a second, spaced-apart exit point. The apparatus is generally indicated at 10 and the tunnel which is shown partially finished is indicated at 12. The apparatus includes (1) a boring device 14 including means to be described below for boring through soil, (2) a thrust conduit 16, (3) a reel support assembly 18 and (4) a thrust assembly 20. Both the reel assembly 18 and thrust assembly 20 are preferably supported on a trailer generally indicated at 22 which also supports a seat 24 for an operator and a control panel with manual controls (not shown).

Still referring to FIG. 1, tunnel 12 is provided in the following manner. Trailer 22 is positioned relatively close to the starting point of the tunnel and an entry opening is manually provided for containing a curved launching tube 26 which may be flexible, telescopic or in any other suitable configuration. The thrust conduit 16 is initially wound around a reel 28 which, as will be described hereinafter, forms part of overall reel assembly 18. The forward most end of the thrust conduit is connected to the back end of boring device 14 and the latter is manually positioned within the entry of launch tube 26. Thereafter, a boring arrangement forming part of device 14 is activated, while at the same time, thrust assembly 20 acts on conduit 16 for thrusting the conduit forward along its axis in the direction of the boring device. Thus, as the device 14 bores through the soil, it is literally pushed forward by the thrust conduit until the boring device reaches its destination.

Turning to FIG. 1A, the boring device 14 is shown in more detail. As seen there, this device includes an elongated main body 30 and a separate boring head mounted to the body for rotation about the axis of the latter. A motor (not shown) is contained within body 30 for rotating the boring head and the latter is provided with a plurality of nozzles 34 which face forward but which are positioned off center with respect to the axis of the boring device. A source of pressurized cutting fluid comprising, for example, water and clay particles, is directed to nozzles 34 through a cooperating high pressure fluid line in order to produce off center cutting jets 36. A source of cutting fluid is generally indicated at 38 and the pressure line between the source and nozzles 34 is diagrammatically illustrated at 40. As seen in FIG. 8, this high pressure line extends from source 38 to boring head 32 through thrust conduit 16.

In order for device 14 to bore through the soil and provide tunnel 12, cutting jets 36 are activated while boring head 32 is rotated about the axis of the boring device at a sufficiently high speed to bore out an opening slightly larger than the diameter of the boring device as the latter is urged forward by thrust cable 16. This presupposes (1) that the boring device is intended to move along a straight line path, (2) that the pressure of each jet is constant, (3) that the boring head is rotated at a constant speed, (4) that the boring device is urged forward at a constant velocity; and (5) the soil is of uniform compactness. Under these conditions, boring device 14 will produce a tunnel 12 of uniform diameter. The actual diametric size of tunnel 12 depends upon a number of factors including how strong the jets are and their angles of offset, how fast or slow the boring device is moved through the soil, and how fast the boring head is rotated. The tunnel is preferably only sufficiently larger than the boring device to allow the spoils to be forced back behind the boring device and out of the tunnel through its entry end. In this regard, a supply of air under pressure, which is generally indicated at 42 in FIG. 1, may be connected to one or more air nozzles 44 on boring head 32 (see FIG. 1A) by means of a cooperating air pressure line 46 to produce one or more air jets 48 at the front end of the boring device. The air jets could also be located at the rear of the boring device, as in an actual working embodiment. In either case, these air jets aid in forcing the spoils back out of tunnel 12. Air line 46 and a power line 50 for bringing power to the motor in boring device 14 for rotating boring head 32 are contained within thrust conduit 16 along with cutting fluid line 40 and additional electronic signal cables and an altimeter line.

Boring device 14 has been described under the various conditions recited immediately above. Referring to FIG. 1B, it will now be assumed that the condition of the soil through which boring device 14 moves is not homogeneous but rather varies in hardness. As illustrated in FIG. 1b, the soil between points A and B has the compactness which is expected; between points B and C, the soil is harder than expected; between points C and D it is again as expected; between points D and E it is softer than expected and; between points E and F it is again as expected. With these different soil conditions but with the remaining presuppositions recited immediately above in effect, as the boring device moves through section A-B, it will bore a tunnel having a desired diameter D. As the boring device enters section B-C because of the harder soil, it takes longer to bore through it. Therefore, if the device is not slowed down, the thrust conduit 16 will push it into engagement with the front wall of the tunnel and jam its boring head which, in turn, will require the operator to continue to pull back on the thrust conduit. Thus in turn will result in that section of the tunnel section having a sporadic diameter if the section could be provided at all. Assuming that section B-C can be provided, upon entering section C-D it will provide the desired tunnel section having a diameter D. However, upon entering section D-E, because the soil is softer than expected, jets 36 will bore out a section having larger diameter D+. In fact, it is quite possible for the jets to bore out a section so large that the device might not get out. However, assuming it does, it will then move through section E-F in the expected manner. The foregoing was a description of how the boring device 14 would function in soils of different hardness if overall apparatus 10 were to attempt to move the boring device along a straight path at a constant speed while maintaining constant pressure fluid jets 36 at a constant speed of rotation of boring head 32. While apparatus 10 does maintain constant pressure jets 36 and while it does rotate boring head at a constant speed (assuming the boring device is to move in a straight line), in accordance with one aspect of the present invention, it does not attempt to urge the boring device forward at a constant speed. Rather, by a rather uncomplicated and reliable means to be described hereinafter, apparatus 10 maintains a constant forward thrust force on conduit 16 which, in turn, forms a constant forward thrust on the boring device itself regardless of the hardness of the soil. Thus, as the boring device moves through section A-B, it does so at a constant velocity and thereby produces a tunnel section having the desire diameter D. When the boring device reaches soil which is harder than expected soil, as in section B-D, and therefore a greater opposing force, it will slow down (due to constant forward thrust) so as not to stall against the front face of the tunnel. Also, because it moves slower, it has more time to bore out the harder soil, thereby resulting in a tunnel section having the desired diameter D or at least approximately so. Upon reaching section C-D, it will pick up speed to the initial level provided through section A-B, again providing a tunnel section having the desired diameter D. Upon reaching softer than expected soil in section D-E, because the soil is easier to bore through and because the forward thrust force applied to the boring device is constant, the boring device will speed up. As it does so, it will have less time to bore through the soil. However, because the soil is easier to bore through, the resultant tunnel through section D-E will have the same diameter D or approximately so.

Thus far, it has been assumed that tunnel 12 is straight. It is to be understood that apparatus 10 is capable of providing non-linear tunnels by providing means on boring device 14 for steering the latter in the desired manner. A particular steering arrangement is described in detail in co-pending application Ser. No. 866,241, filed on May 22, 1986 now U.S. Pat. No. 4,714,118, and entitled TECHNIQUE FOR STEERING AND MONITORING THE ORIENTATION OF A POWERED UNDERGROUND BORING DEVICE assigned to assignee of the present application, which application is incorporated herein by reference. This steering technique will be described in more detail below.

As stated above, to move boring device 14 through the soil along a straight line path, it is merely necessary to rotate boring head 32 at a constant speed in order to maintain its straight line movement. This is best exemplified in FIG. 11A which diagrammatically illustrates the boring device 14 as it provides a straight tunnel 51. This is accomplished because the cutting jets 36 cut away the soil in front of the device uniformly around its boring head. As it does so, the boring device is continuously urged forward into the cut away in front of it, which cut away is generally indicated at 53a in FIG. 11A.

In accordance with one aspect of the present invention, it is desirable to be able to cause the boring device 14 to follow a non-linear path. One way that this has been accomplished in the past has been to physically turn the boring head of the device off axis with respect to its main body. This has been found to be difficult to do and not always reliable, particularly in relatively compact soil. Steering is accomplished in accordance with the present invention without turning the head off axis at all. Rather, as will be described immediately below, the axial rotation of boring head 32 is modulated in a controlled way so that the cutting jets spend more time along a particular segment of their rotating paths than on the rest of their paths of movement, depending upon the particular path to be taken by the overall device. This is exemplified in FIGS. 11B and 11C. As seen there, rotation of boring head 32 is modulated in a way which causes the cutting jets to spend more time along a vertically downward segment of their rotational paths. This causes more of the soil in that direction to be cut away than along the rest of the circumference around the boring head. Thus, the cut away at the head of tunnel 51 in FIGS. 11b and 11c take on the downward orientation, first gradually as illustrated at 53b in FIG. 11B and then more acutely as shown at 53c in FIG. 11c. At the same time, the overall boring device is being urged forward by means of conduit 16. As a result, the boring device is turned downward into the cut away and eventually turns with it. Assuming it is desirable merely to make a downward, 90° turn, once cut away 53c is formed, uniform rotation of the boring head would be resumed in order to form a downwardly extending, straight tunnel section.

Turning now to FIGS. 12 and 13A–C, attention is directed to the way in which boring head 32 is modulated rotationally in order to turn the overall device. To this end, only certain components of boring device 14 are illustrated in FIG. 12, they include its main body 30, its boring head 32 and cutting jet nozzles 34, a variable speed, reversible DC motor 55 and a planetary gear box 57 which couples motor 55 to boring head 32 for driving the latter. The motor is powered and controlled by an external source, as previously indicated, and by suitable control means which may be located in an overall process control panel 60 illustrated in FIG. 1 through power line 50. As shown in FIG. 12, boring head 32 includes a rearwardly extending stem 65 which defined its axis of rotation coaxial with the elongation axis of the boring device and which is rotatably connected to the output shaft of motor 55 through planetary gear box 57. In this way, a variable speed, reversible motor is able to rotate boring head 32, either clockwise or counterclockwise, about the axis of stem 65 and therefore about the elongation axis 67 of the boring device at varying speeds. As a result, the nozzles 34 and their associates cutting jets 36 which are located off axis with respect to elongation axis 67 may be rotated clockwise or counterclockwise about elongation axis 67 at varying speeds. This is best illustrated in FIGS. 13A–C where one of the cutting jets 34 and its associated path of movement are illustrated diagrammatically by means of a number of arrows. FIG. 13A diagrammatically illustrates a path of movement of the cutting jet when the boring head is rotated in the same direction, for example counterclockwise, at a constant speed. Under these circumstances, the boring device will follow a straight line path. In FIG. 13b, the cutting jet is shown spending more time along a right hand segment of its path in order to cause the boring device to turn to the right. FIG. 13C diagrammatically illustrates the cutting jet spending more time along an upper segment of its path so as to cause the device to turn upward. There are different ways to modulate boring head 32 in order to cause the boring device to make a turn. It can be rotated at a constant speed but reciprocated back and forth through the preferred segment, as illustrated by the plurality of adjacent arrows in FIG. 13B; it can be moved in the same direction but slower through the preferred segment as illustrated diagrammatically by the enlarged arrow in FIG. 13C; or a combination of both of these latter approaches can be used. In any of these cases, it is only necessary to control motor 55 through, for example, controls at panel 60 to accomplish the desired end.

Returning to FIG. 1 in conjunction with FIG. 2, attention is now directed to the way in which thrust assembly 20 acts on conduit 16 for thrusting the latter and boring device forward at a constant force regardless of the soil conditions through which the boring device passes. In this latter regard, in an actual working embodiment, it is contemplated that assembly 20 must apply between 200 and 2,000 pounds of thrust force to conduit 16 to provide tunnel 12 under most soil conditions. This assumes that there are no appreciable counterforces present on the cable due to reel assembly 18. As will be seen hereinafter, assembly 18 does, in fact, contribute a certain small amount of counter thrust force in the form of drag to the conduit in accordance with a second feature of the present invention. Ignoring this drag for the moment, thrust assembly 20 includes three pneumatic tires 50a, 50b and 50c (only two of which are shown in FIGS. 1 and 2). These tires are mounted for rotation by suitable means (not shown in FIGS. 1 and 2) so as to frictionally engage thrust conduit 16 at three equally circumferentially spaced points around the thrust conduit. Each of these tires is driven about its own axis by means of its own hydraulic motor which is connected through a cooperating worm type gear box. The three hydraulic motors are best illustrated in FIG. 3 at 52a, b and c and cooperating gear boxes are shown at 54a, b and c. It should be apparent that by rotating all three tires in the appropriate direction and at the same speed, they can be made to thrust conduit 16 in the forward direction so as to push the boring device forward or they can be made to thrust the conduit rearwardly in order to pull the boring device back towards trailer 22. To this end, the three motors are hydraulically connected together in series. This not only insures that they operate at the same speed but also insures that one will not slip on a thick section of conduit 16.

Referring to FIG. 3 attention is now directed to the way in which thrust assembly 20 maintains the thrust force exerted on the conduit constant regardless of soil conditions. This is accomplished by operating each of the hydraulic motors 52 with constant torque. This, in turn, is accomplished by controlling the way in which hydraulic drive fluid is fed to each of the motors. Specifically, the drive fluid is first directed from its supply generally indicated at 56 to a manifold 58 which in turn feeds the drive fluid to series connected motors 52a, b and c through an electrically operated flow valve 57. The hydraulic pressure to the motors is monitored by means of a cooperating pressure transducer arrangement (not shown) which delivers a corresponding signal to a control processing unit 60 (see FIG. 1). This information is then used to control valve 57 so that the hydraulic pressure across the motors is constant. Thus, as the boring device passes through harder soil, the initial pressure build-up resulting at the motors 52 is relieved by reducing hydraulic flow at the valve 57. On the otherhand, as the boring device moves through softer soil, initially causing the pressure at the motors to drop, the valve 57 increases hydraulic flow to the motors. By providing a constant hydraulic pressure drop across the three motors 52, the motors function as constant torque motors and thereby apply constant force to cable 16 regardless of the soil conditions. The same results could be accomplished by means of electric motors by applying constant current to these latter motors, although electric motors would be controlled independent of one another with separate control means.

Having described thrust assembly 20, attention is now directed to reel assembly 18. As indicated previously, this latter assembly includes a reel 28. As seen in FIG. 1, the reel is supported for rotation about its own axis behind and spaced from thrust assembly 20 by suitable support means generally indicated at 62. In an actual working embodiment, thrust conduit 16 is approximately 500 feet long and has an outer diameter of 2 ⅜ inches. This entire cable is initially wound around the drum which, itself, has a minimum outer diameter of 36". While the thrust conduit is quite flexible over relatively long lengths and is able to bend about a radius of curvature as small as 18", over relatively short lengths it is somewhat rigid, as stated previously. Therefore, when it is wound around the reel it has the tendency to want to unwind in an uncontrollable way, much as a watch spring would do. Therefore, in order to prevent this, it is imperative that the section of cable between the drum and thrust assembly 20 be maintained taut at all times. The way in which this is accomplished is greatly affected by the desire or need to positively drive the reel in order to unwind conduit 16 from it as the conduit is thrust forward by assembly 20. Note that but for such positive action on the part of the reel assembly, the thrust motors 52 would have to be extraordinarily large to apply sufficient thrust to the conduit to move the boring device in the desired way. By driving the reel independent of the thrust assembly, reel drag can be eliminated entirely. However, as will be seen below, the reel assembly is operated with a minimal amount of drag in order to maintain the section of conduit 16 between the reel assembly and thrust assembly taut.

Still referring to FIG. 3 in conjunction with FIG. 1, reel assembly 18 is shown including its own hydraulic motor 64 which is connected to reel 28 through its own gear box 66 for rotating the reel about its own axis. Hydraulic drive fluid is fed to motor 64 from manifold 58 through a cooperating electrically controlled valve 68 and counter balance check valve 69 which adjusts reel free wheel drag to be discussed below. Motor 64, like motors 52, may be operated at constant torque and thus may include suitable means including a pressure transducer arrangement (not shown) for sensing the pressure across it and for operating valve 68 accordingly. By utilizing a constant torque motor to drive the reel, the latter can be made to vary in speed depending upon the amount of conduit remaining on the reel so as to provide a minimal amount but some drag on the conduit between the reel and thrust assemblies as the conduit is unwound, thereby insuring that the conduit is maintained taut between these assemblies. However, as the thrust assembly pushes the thrust conduit forward, the reel can be allowed to turn without hydraulic power. Conduit tension is maintained by metering hydraulic flow through the reel assembly drive motor 64 with check valve 69 which is installed at manifold 58 under control valve 68.

Having described overall apparatus 10 and particularly the way in which this apparatus can provide a tunnel 12, attention is now directed to FIG. 4 which illustrates the way in which the apparatus can be used to install new cable, conduit or pipe within tunnel 12. This is accomplished by providing the forwardmost end of boring device 14 with a suitable coupling member 69 connecting one end of the new utility to the boring device. Once this is done, as illustrated in FIG. 4, thrust assembly 20 can be driven in reverse so as to urge conduit 16 in the direction of reel assembly 18, thereby pulling boring device 14 back through the tunnel to its initial starting point. As it does so, the boring device pulls the utility into the tunnel with it from, for example, its own suitable reel 71. So long as the initially provided tunnel is of sufficient diameter to receive the new utility, the jets 36 are not activated. However, if the new cable requires that the tunnel be wider, the jets can be turned on as the boring device is pulled back through the tunnel so as to bore out a larger size tunnel.

Whether the boring device 14 is urged forward to bore out a new tunnel or pulled rearwardly to install new utility, a section of thrust conduit 16 between reel assembly 18 and thrust assembly 20 must be maintained taut. Therefore, in the case where the apparatus is pulling a new utility into the ground, it is important to operate the two assemblies so that the thrust assembly places a slight drag on the reel assembly rather than vice-versa while the reel is driven with slightly greater torque force. Also, the overall apparatus may include an additional control valve (not shown) out of manifold 58 (see FIG. 3) for applying additional hydraulic drive fluid to both the reel and thrust assemblies in order to pull the boring device back through the tunnel at a greater speed. In this case, the amount of additional hydraulic fluid being applied would be such that the drag relationship between the two assemblies would remain unchanged.

Having described overall apparatus 10 and the way in which it operates, attention is now directed to an actual working embodiment of the apparatus including specifically thrust conduit 16, reel assembly 18, thrust assembly 20 and trailer 22. The trailer itself constructed in accordance with an actual working embodiment is shown in FIGS. 5–7 supporting an actual reel assembly 18, thrust assembly 20 and operators seat 24. The actual thrust conduit itself is shown in FIG. 8. Finally, an actual working thrust assembly is illustrated in FIGS. 9 and 10. It is to be understood that the present invention is not limited to these specific actual working embodiments.

What is claimed is:

1. In an apparatus for providing a continuous underground tunnel by means of an elongated boring device including forward facing off-axis cutting means, said device being rotated at a constant rate about its elongation axis while being urged forward through the soil, whereby to cause the device to move forward along a straight line path while boring a tunnel in the soil as it does so, the improvement comprising means for varying the speed and/or the direction of rotation of said boring device in a controlled way depending upon the desired direction to be taken by the device as it moves forward through the soil, whereby to cause the boring device to move along a curved path of movement in a controlled way, said controlled way of varying the speed and/or direction of rotation of said boring device being such that said cutting means spends more time along a particular segment of its rotating path than on the rest of its path of movement so that the particular segment of said rotating path determines the particular curved path taken by the boring device.

2. The improvement to claim 1 wherein said means for varying the speed and/or direction of rotation of said boring device includes a motor connected with said boring head and means for modulating the speed of said motor and therefore the speed of said boring head and said cutting means depending upon the path to be taken by said boring device.

3. The improvement according to claim 2 wherein said boring device includes a main body and wherein said motor is located within said main body.

4. The improvement according to claim 1 wherein said cutting means includes means for producing a pressurized fluid cutting jet on the front of said boring device.

5. The improvement according to claim 4 wherein said fluid cutting jet is located in front of said boring device at an acute angle with the elongation axis of said boring device.

6. The improvement according to claim 1 wherein said means for moving said boring head includes a reversable motor connected with said boring head and means for modulating the direction of rotation of said motor and therefore the direction of rotation of said boring head and said cutting means depending upon the path to be taken by said boring device.

7. In a method for providing a continuous underground tunnel by means of an elongated boring device including forward facing off-axis cutting means, said device being rotated at a constant rate about its elongation axis while being urged forward through the soil whereby to cause the device to move forward along a straight line path while boring a tunnel in the soil as it does so, the improvement comprising the step of varying the speed and/or the direction of rotation of said device in a controlled way depending upon a desired curved path to be taken by the device as it moves forward through the soil, said controlled way of varying the speed and/or direction of rotation of said boring device being such that said cutting means spends more time along a particular segment of its rotating path than on the rest of its path of movement so that the particular segment of said rotating path determines the particular curved path taken by the boring device.

* * * * *